United States Patent [19]

Mizuno

[11] 4,442,439

[45] Apr. 10, 1984

[54] INK JET PRINTING APPARATUS

[75] Inventor: Akinori Mizuno, Yokohama, Japan

[73] Assignee: Ricoh Co. Ltd., Japan

[21] Appl. No.: 203,542

[22] Filed: Nov. 3, 1980

[30] Foreign Application Priority Data

Nov. 8, 1979 [JP] Japan ................................ 54-144660

[51] Int. Cl.$^3$ ......................... G01D 9/00; G01D 15/18

[52] U.S. Cl. ......................................... 346/1.1; 346/75

[58] Field of Search ........................... 346/75, 1.1, 140; 355/3 CH, 3 DR

[56] References Cited

U.S. PATENT DOCUMENTS 3,060,429 10/1962 Winston .................. 346/140 IJ UX 4,236,811 12/1980 Hirose et al. ................ 355/3 CH X

FOREIGN PATENT DOCUMENTS 54-19743 2/1979 Japan .................................... 346/75

*Primary Examiner*—Donald A. Griffin

*Attorney, Agent, or Firm*—McGlew and Tuttle

[57] ABSTRACT

An electrostatic type ink jet printing apparatus, wherein a charger activated by a direct current source is disposed close to the surface of the recording paper conveying drum or belt in order to charge the surface of the drum or belt inversely to the polarity of charge on charged ink drops. On that occasion, charged areas may be intermittently disposed on the recording paper conveying drum or belt. Moreover, the recording paper is tightly and electrostatically fixed on the recording paper conveying drum or belt, so that the charged condition on the surface of the recording paper is kept stable and therefore formation of high quality printed image may be realized regardless to the environmental circumstance related, for instance, to humidity, electric field, and the like.

23 Claims, 18 Drawing Figures

INK JET PRINTING APPARATUS

BACKGROUND OF THE INVENTION

The present invention relates to an improved ink jet printing apparatus including an ink ejection means for ejecting ink through a nozzle into an ink jet which is broken into ink drops, a charge electrode for charging the ink drops in response to printing signals, deflection electrodes for deflecting the charged ink drops, and a recording medium conveying means for conveying a recording medium upon which said charged ink drops impinge.

In such an apparatus, the print position is determined in accordance with the charging amount on the ink drop. Supposing that the recording medium to be printed is partially charged, the positions printed by the ink drops fall into disorder depending upon the charged condition on the recording medium, so that the printed image of high quality may not be attained.

In the prior art, a method of uniformly charging the surface of the recording medium or neutralizing the charge on the recording medium has been proposed in order to eliminate the afore-mentioned defect. However, in the case that a recording paper is used as the recording medium for printing image, the states of charging differ from each other in accordance with humidity so that a constant and stable image may not always be reproduced. And, even in the case of neutralizing the charge on the surface of the recording paper by uniformly discharging said charge by means of a corona charger, the quality of the recording paper is not always uniform, so that an inequality in charging partially appears and in consequence the print position may not be precisely fixed. The position may vary with the quality of the recording paper which is not always constant. Therefore, the initially expected object could not be sufficiently accomplished.

Furthermore, the respective diameters of printed dots become different depending upon the flying velocity of the ink drops at the moment of their collision against the recording paper and a distortion of the printed image occasionally appears as the recording paper is frictionally charged. This happens when the recording paper is not tightly attached to the recording paper conveying means, and especially when the leading edge of the recording paper separates from the recording paper conveying means.

SUMMARY OF THE INVENTION

An object of the present invention is to provide an ink jet printing apparatus in which a precise print position is obtained by stabilizing the charge condition of the recording medium and, in consequence, a printed image of high quality is attained.

Another object of the present invention is to provide an ink jet printing apparatus which always produces a stable printed image by making the charge condition constant independently of the humidity, when the recording medium is paper.

Another object of the present invention is to provide an ink jet printing apparatus which always produces a stable printed image by preventing inequality in charging which in turn causes disorder of the printed position at the time when the charge on the charged recording medium is neutralized by uniformly discharging the recording paper using a corona charger even in the case that the quality of the recording paper is not always uniform.

Another object of the present invention is to eliminate the defect that when dot printing is performed by the ink drop being ejected from the nozzle of very small diameter in the ink ejection head for the purpose of attaining high resolution, the flying orbit of the ink drops is put out of order because the movement of the ink drops in influenced by the environmental electric field and aerodynamic resistance variation and in consequence inequality of the print position appears and the printed image is distorted.

Another object of the present invention is to provide an ink jet printing apparatus which eliminates a disadvantage that the diameters of the respective dots printed on the recording paper differ from each other depending upon the ink drop flying velocity at the moment when the ink drop impinges upon the recording paper and in consequence the printed image is distorted. For instance, the greater the amount of deflection, the smaller is the flying velocity of the ink drop at the recording paper.

Another object of the present invention is to provide an ink jet printing apparatus which eliminates an occurance of an electric field that is due to a high voltage in the recording paper which is frictionally charged on its conveying way because of a considerably long distance between the recording paper and the grounded portion. The above mentioned electric field also causes distortion in the printed image.

Another object of the present invention is to eliminate the defect that the leading edge of the recording paper may not be tightly attached to the recording paper conveying means when the recording paper is fed toward the recording paper conveying means an in consequence the leading edge of the recording paper separates from the recording paper conveying means, so that distortion of the printed image occurs at this point, and paper feeding may not be smoothly performed.

Other objects, together with the foregoing, are attained in the embodiments described in the following description and illustrated in the accompanying drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

Figure 1:
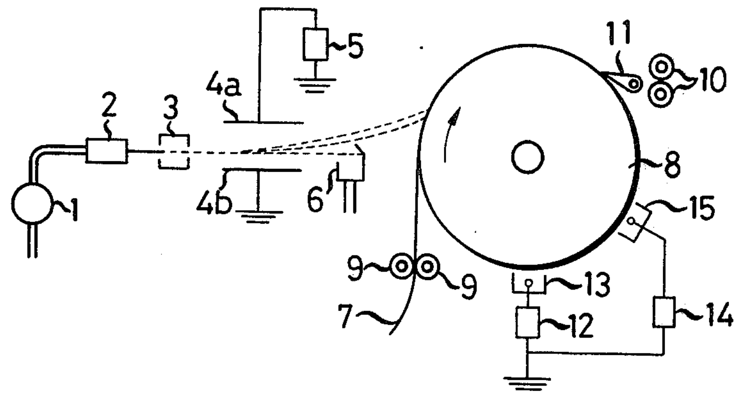
FIG. 1 is a schematic explanatory view of a first embodiment of an ink jet printing apparatus according to the present invention.
Figure 3:
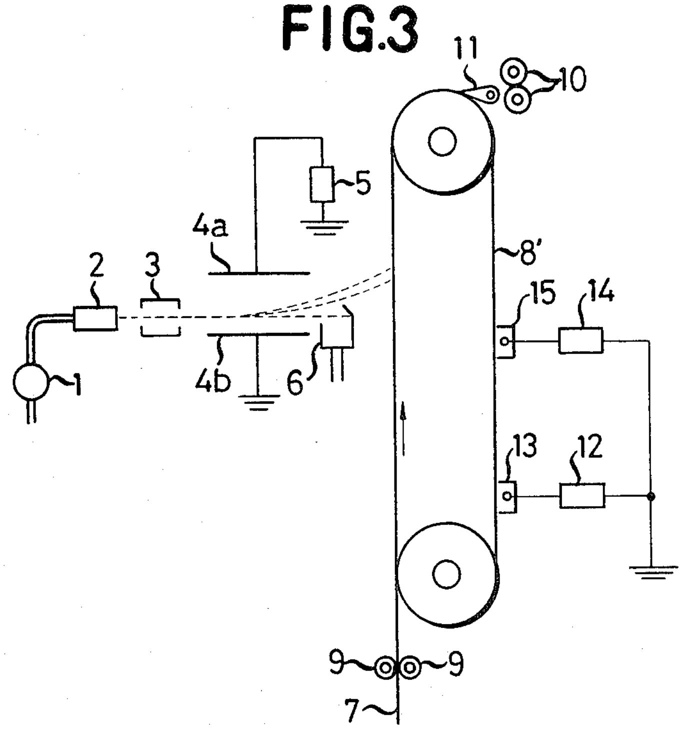
Figure 4:
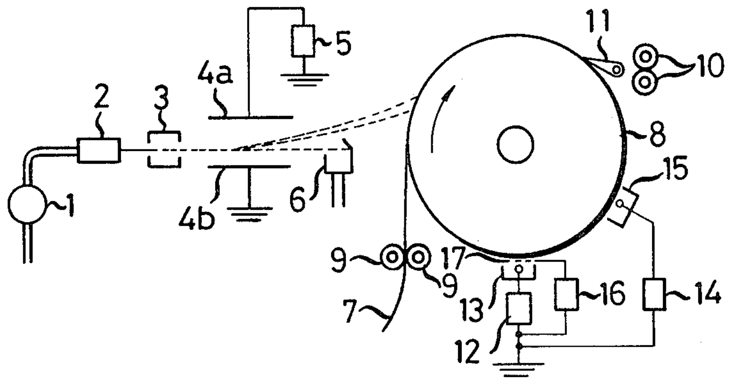
Figure 5:
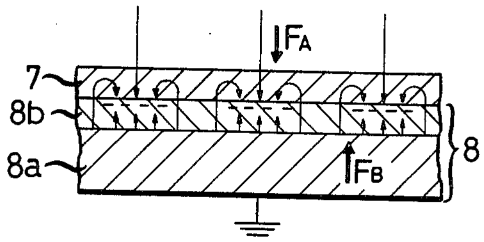
Figure 6A:
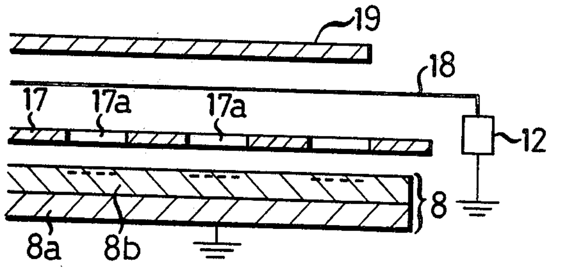
Figure 6B:
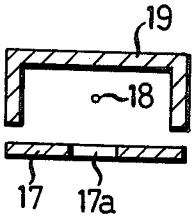
Figure 7:
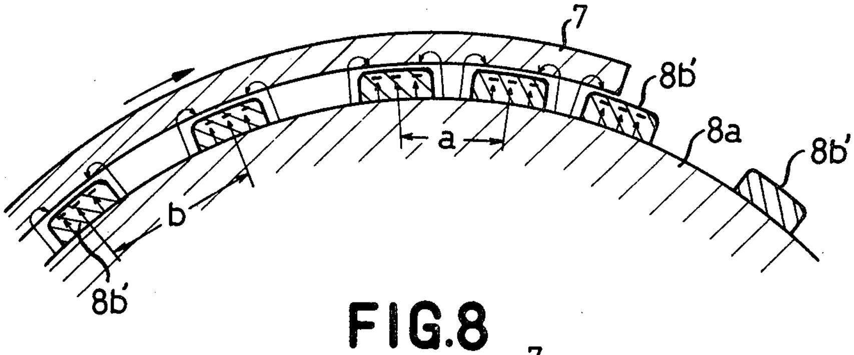
Figure 8:
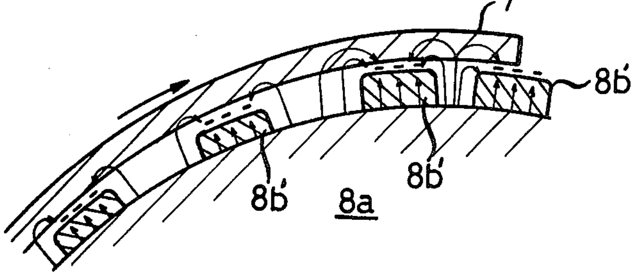
Figure 9:
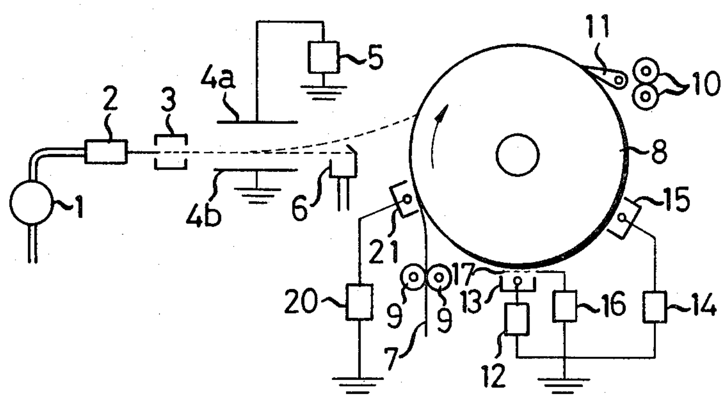
Figure 10:
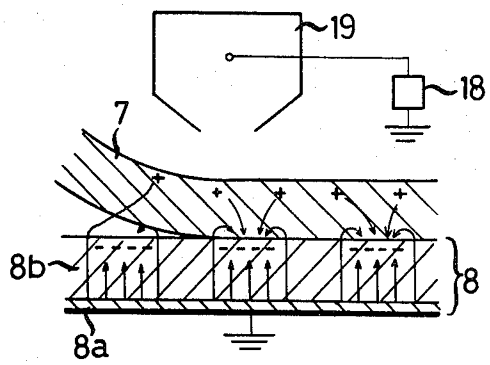
Figure 11:
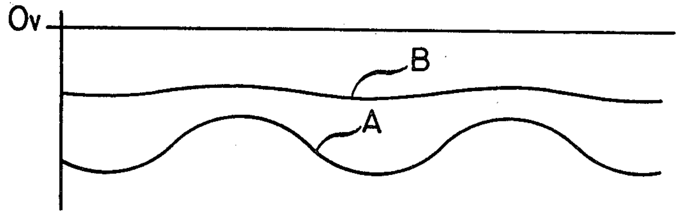
Figure 12:
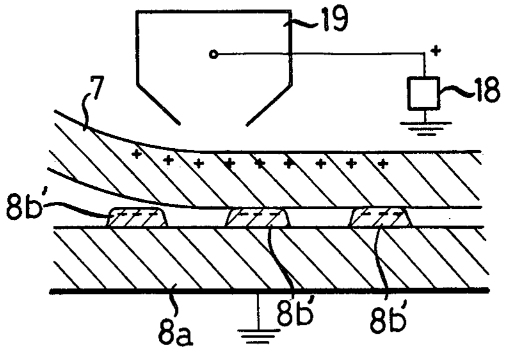
Figure 13:
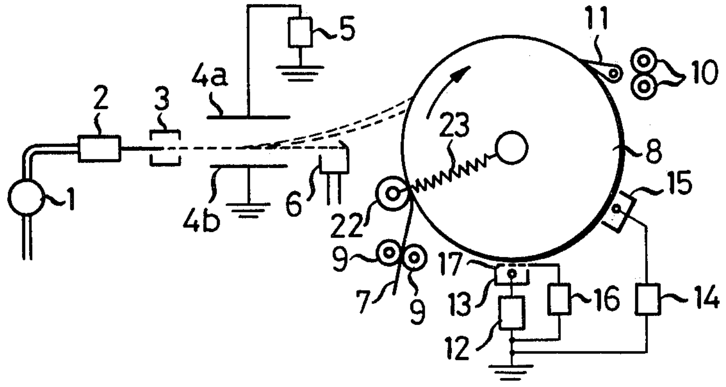
Figure 14:
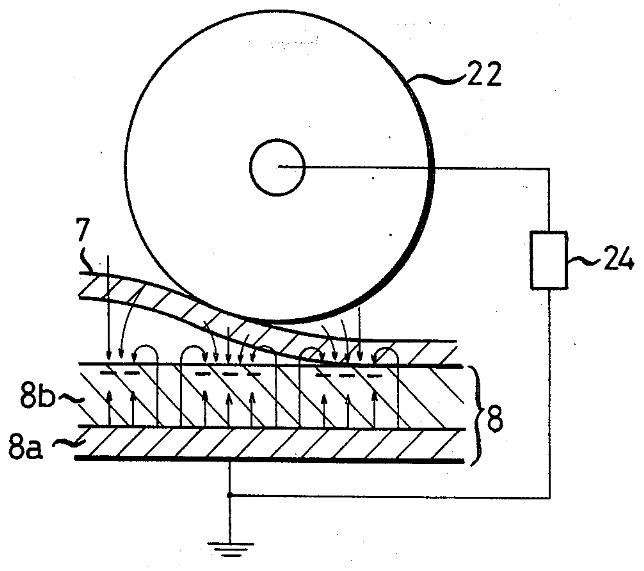
Figure 15:
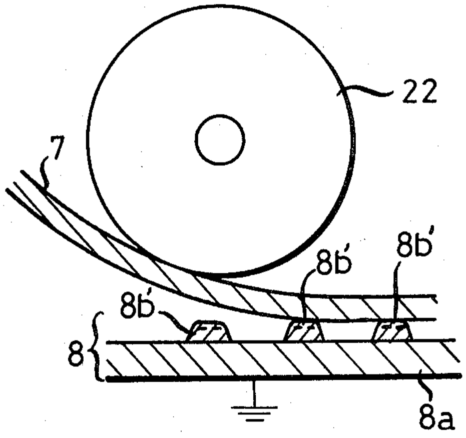

FIGS. *2a, 2b* and *2c* are partial sectional views of the recording paper conveying means embodying the present invention illustrating its noncharged state, charged state, and charged and paper conveying state, respectively;

FIG. 3 is a schematic explanatory view of a modification of the first embodiment shown in FIG. 1;

FIG. 4 is a view similar to FIG. 3 of a second embodiment of the ink jet printing apparatus according to the present invention;

FIG. 5 is a sectional partial view of an electric field distribution in the printing area of the recording paper conveying means of the apparatus shown in FIG. 4;

FIGS. 6A and 6B are longitudinal and a cross sectional views respectively, of the charger in the apparatus shown in FIG. 4;

FIG. 7 is a partial enlarged sectional view of the dielectric drum in a third embodiment of the ink jet printing apparatus according to the present invention;

FIG. 8 is a partial enlarged sectional view of a modification of the third embodiment;

FIG. 9 is a view similar to FIG. 4 of a fourth embodiment of the ink jet printing apparatus according to the present invention;

FIG. 10 is an enlarged sectional view of the apparatus shown in FIG. 9;

FIG. 11 is a diagram for explaining surface electric potential distributions of the recording paper conveying means shown in FIGS. 9 and 10;

FIG. 12 is an enlarged sectional view of a modification of the fourth embodiment;

FIG. 13 is a view similar to FIG. 9 of a fifth embodiment of the ink jet printing apparatus according to the present invention;

FIG. 14 is an enlarged sectional view of a modification of the fifth embodiment; and FIG. 15 is an enlarged sectional view of another modification of the fifth embodiment.

DESCRIPTION OF THE PREFERRED EMBODIMENTS

While the ink jet printing apparatus of the present invention is susceptible of numerous physical embodiments, depending upon the environment and requirements of use, a substantial number of the embodiments herein shown and described have been made, tested and used, and all have performed in an eminently satisfactory manner.

First Embodiment, FIGS. 1 to 3

FIG. 1 schematically shows the overall construction of an exemplary ink jet printing appartus to which the present invention is applicable, as the first embodiment. The ink jet printing apparatus has an ink pressure pump 1, and ink ejection head 2, a charging electrode 3, deflection electrodes 4*a* and 4*b*, an electric source 5 for the deflecting electrodes, a gutter or ink catcher 6, a sheet of recording paper 7, a recording paper conveying drum 8, a pair of paper feeding rollers 9, a pair of paper exhausting rollers 10, and a separation claw 11 for separating the recording paper 7 from the recording paper conveying drum 8.

As is well known, ink in the ink ejection head 2 is pressurized by the ink pressurizing pump 1, ejected through a nozzle of the ink ejection head and charged in the charging electrode 3 in response to the printing signal at the time when the ejected ink stream breaks into ink drops, and these charged ink drops are deflected through the deflection electrodes 4*a* and 4*b* in accordance with the charged amount on the ink drops and reproduce the image information on the recording paper 7. As described above, such an electrostatic type ink jet printing apparatus has a defect that when the recording paper 7 is partially charged, for instance frictionally charged, the position printed by the ink drops falls into disorder by the frictional charge on the recording paper 7, so that the quality of printing is degraded. In order to eliminate the afore-mentioned defect, it has been proposed to uniformly charge the recording paper 7 in advance or to neutralize the charge on the recording paper 7, as already stated. On that occasion, the initially expected object may not always be attained because of the humidity at the time of printing of the quality of the recording paper.

The present invention is used to improve the afore-mentioned technology of the prior art, and to attain a high quality of the printed image. Referring to FIG. 1, a direct current source 12, a charger 13, an alternating current source 14, and a discharger 15 are disposed in the vicinity of the peripheral portion of the recording paper conveying drum 8. The surface of the recording paper conveying drum is uniformly charged inversely to the polarity of charge on the charged ink drop by means of the charger 13.

Figure 2A:
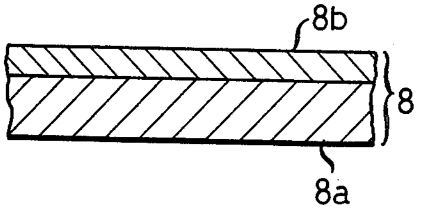
Figure 2B:
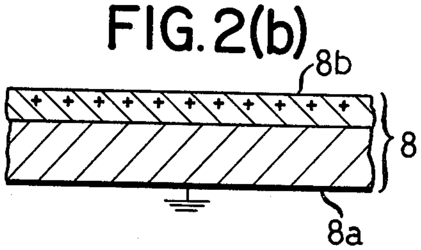
Figure 2C:
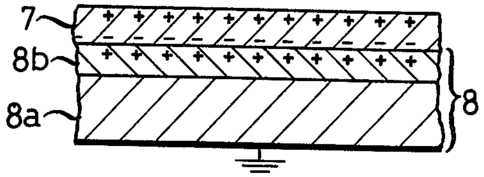

As shown in FIG. 2*a*, the recording paper conveying means 8 is composed of, for example, an electrically conductive layer 8*a* and a dielectric layer 8*b*. While printing, drum 8 rotates in the direction shown by an arrow in FIG. 1, and when it arrives at the portion opposing to the charger 13 the dielectric layer 8*b* is charged inversely to the polarity of charge on the charged ink drop. For instance, when the ink drop is negatively charged the dielectric layer 8*b* is positively charged as shown in FIG. 2*b*. The recording paper conveying drum 8, charged in a manner as described above, rotates in the direction shown by the arrow in FIG. 1. When the recording paper fed by a pair of paper feeding rollers 9 comes into contact with the charged portion of the recording paper conveying drum 8, the surface of the recording paper 7 is charged inversely to the polarity of charge on the charged ink drop as shown in FIG. 2*c*. Then, the condition of charging on the recording paper 7 depends upon that of charging on the dielectric layer 8*b* and it is never influenced by the humidity at the time of printing, that is to say, the amount of water contained in the recording paper 7, or the quality of the recording paper 7. Consequently, printing may always be performed uniformly and constantly.

FIG. 3 is a view in explanation of a modification of the first embodiment shown in FIG. 1, wherein a recording paper conveying belt 8' is used instead of the recording paper conveying drum 8 shown in FIG. 1. As all other parts except for the recording paper conveying means are same as those of the first embodiment shown in FIG. 1, same reference numeral is affixed to the parts having the same performance as in FIG. 1, and its detail description is omitted. While the examples of the apparatus comprising a corona charger, for alternatingly charging and discharger which is activated by the alternating current source 14 for discharging charge on the charged recording paper conveying drum of belt after printing, are illustrated above, it might be easily understood that a direct current source having the polarity which is inverse to that of the charge on the recording paper conveying means, can be used in order to neutralize charge on the recording paper conveying means for the purpose of discharging it, or a grounded electrode that comes into contact with the recording paper conveying means or is disposed close to it can be used instead of the corona charger.

As is apparent from the afore-mentioned illustrations, it will be seen that the present invention provides an ink jet printing apparatus which always attains a constant printed image of high quality because the printed image is never influenced by the humidity while printing and the quality of the recording paper since the recording paper conveying means is charged according to the present invention.

Second Embodiment, FIGS. 4 to 6

FIG. 4 shows a second embodiment of the present invention. In the known electrostatic type ink jet printing apparatus, the greater the charging quantity on the charged ink drops, the greater the deflected distance is and the longer the flying distance of the charged ink drop from the ejection nozzle to the recording paper 7 is. Consequently, as the flying velocity of the charged ink drops at the moment of impact on the recording paper 7, becomes smaller, in the case of longer flying distance, the diameter of the dot formed on the recording paper 7 also becomes smaller, which results in a distortion of the printed image.

According to the second embodiment of the present invention shown in FIG. 4 the afore-mentioned defect of the prior art technology may be eliminated. As shown in FIG. 4, in the vicinity of the peripheral portion of the dielectric drum 8 are disposed a charger 13 having a direct current source 12, a charging control circuit 16 and an aperture board 17, and a discharger 15 having an alternating current source 14. The surface of the dielectric drum 8 is intermittently charged inversely to the polarity of charge on the charged ink drop. In this case, it is preferable to uniformly charge intermittent areas to be charged, leaving uncharged areas between the intermittent areas, as shown in FIG. 5. In FIG. 5, the electrically conductive layer 8*a* of the dielectric drum 8 is uniformly coated or vapor deposited with the dielectric material 8*b*. When the ink drop is positively charged the surface of the dielectric drum 8 is intermittently and negatively charged and an acceleration electric field $F_A$ for accelerating the charged ink drop and a clamping electric field $F_B$ for electrostatically clamping the recording paper 7 are formed on the insulated drum 8 as shown in FIG. 5. In FIGS. 6A and 6B, 17*a* is an aperture formed in the aperture board 17, 18 a corona wire, and 19 a shielding electrode. The corona wire 18 is surrounded by the shielding electrode 19, a corona discharge is radiated from the corona wire 18 and directed through the apertures 17*a* toward the drum 8 by controlling the electric potential of the aperture board 17*a*, and the surface of the dielectric layer 8*b* is negatively charged, as shown in FIG. 6A. The charge on the dielectric drum 8, charged in such manner, is discharged by the discharger 15 after passing through the surface of the recording paper 7 and charged again by the charger 13.

As described above, in the electrostatic type ink jet printing apparatus, the greater the charging quantity on the ink drop, the greater the deflection distance of it is and therefore the smaller the flying velocity at the moment of impact with the recording paper. Consequently, the diameter of the dot printed on the recording paper 7 becomes small. According to the present invention, when the surface of the dielectric drum 8 is charged inversely to the polarity of charge on the charged ink drop, the greater the charging quantity on the charged ink drop the more greatly the charged ink drop is accelerated. As a result, the velocities of all ink drops at the moment of impact are nearly equal and the printed image can be reproduced without distortion. When an intermittent electric field pattern is formed between the recording paper 7 and the insulated drum 8 according to the present invention, the differential value of the electric field (grad $E^2$) becomes larger and therefore the recording paper 7 is tightly electrostatically clamped on the insulated drum 8. Furthermore, since the electric capacitance between the recording paper 7 and the dielectric drum 8 becomes large, the electric potential caused by frictionally charging becomes small and in consequence distortion of the printed image caused by frictional charging can be eliminated.

To this point, an example of intermittently charging the insulated drum 8 composed of the electrically conductive layer on which the dielectric material is uniformly coated or vapor deposited, has been described. In addition, it is also possible to uniformly charge the insulated drum 8 which is composed of the electrically conductive layer on which the dielectric material is intermittently coated or vapor deposited. On that occasion, as there is no necessity for providing the aperture board, the construction of the charger can be simplified.

Third Embodiment, FIGS. 7 and 8

FIGS. 7 and 8 are sectional view showing a third embodiment of the present invention and its modification for particularly preventing separation of the leading edge of the recording paper 7 from the dielectric drum 8, respectively. In both figures, an electrically conductive layer 8*a* of the dielectric drum 8 is intermittently coated or vapor deposited with the dielectric material 8*b*′, the surface of which is uniformly and positively charged in the case that the ink drop is negatively charged. As is apparent in FIG. 7, the pitch a of the dielectric layer 8*b*′ at the portion facing the leading edge of the recording paper 7, is smaller than the pitch b of that at the other portions, so that the attraction force between the dielectric drum 8 and the leading edge of the recording paper 7 becomes larger. Consequently, as the leading edge of the recording paper 7 is tightly fixed on the dielectric drum 8, separation of the recording paper from the dielectric drum can be prevented. According to the modification shown in FIG. 8, as the coated or vapor deposited dielectric layer 8*b*′ is thicker at the portion with which the leading edge of the recording paper 7 comes into contact, electrostatic capacitance between the surface of the dielectric layer 8*b*′ and the electrically conductive layer 8*a* is smaller and therefore the peripheral electric potential is higher, so that the attraction force between the dielectric drum 8 and the leading edge of the recording paper 7 also becomes larger. As described above, it is possible to prevent separation of the recording paper 7 from the dielectric drum by enlarging the differential value of the electric field at the leading edge of the recording paper 7 and/or by enhancing, the density of the electric field. However, is its density if largely enhanced the electric field has an influence upon the flying ink drops. On that occasion, it is better to avoid printing at the area near the leading edge of the recording paper 7.

Fourth Embodiment, FIGS. 9 to 12

FIG. 9 shows a fourth embodiment of the present invention. As shown in FIG. 9, the recording paper 7 is tightly fixed on the dielectric drum 8 in order to prevent separation of recording paper 7 from the dielectric drum 8. A direct current source 20 and a corona charger 21 are additionally provided in the apparatus in order to charge the recording paper 7 inversely to the polarity of charge on the charged dielectric drum 8 and tightly fix the recording paper 7 to the dielectric drum 8 by the attraction force between them.

FIG. 10 is a detail view of a corona charger 19 and its circumference. As shown in FIG. 10, the electrically conductive layer 8*a* of the dielectric drum 8 is uniformly coated or vapor deposited with the dielectric material 8*b* and the surface of the dielectric material 8*b* is intermittently charged by the charger 13 inversely to the polarity of charge on the charged ink drop. Consequently, the recording paper 7 is attracted by the intermittent electric field to the dielectric drum 8. According to the present invention, since the recording paper 7 is charged by the corona charger 19 inversely to the polarity of charge on the charged dielectric drum 8, the recording paper 7 is tightly fixed by the attraction force on the dielectric drum 8, so that separation of the recording paper 7 from the dielectric drum 8 can be effectively prevented.

FIG. 11 is a diagram for explaining surface electric potential distribution, in which a curve A shows a surface electric potential distribution on the dielectric drum 8 before feeding the recording paper 7 thereto and another curve B shows the surface electric potential distribution on the recording paper 7 to which a corona ionization is applied. As is apparent in FIG. 11, a leakage electric field is nearly equalized by charging the recording paper 7 and at the same time the un-uniform electric field on the dielectric drum in the area where it comes in contact with the recording paper 7 is mitigated.

FIG. 12 shows a modification of the fourth embodiment. In FIG. 12, the surface of the electrically conductive layer 8*a* is intermittently coated or evaporated with the dielectric material 8*b*'. The dielectric layers thus coated or evaporated are uniformly charged. According to this embodiment shown in FIG. 12, the construction of the charger can be simplified.

As is apparent from the afore-mentioned description, it is possible to tightly and effectively fix the recording paper 7 by the attraction force on the recording paper conveying drum 8 or belt 8' caused by the un-uniform electric field formed on the recording paper conveying means 8 or 8' and the corona discharge applied to the recording paper 7. For that reason, separation of the recording paper 7 from the recording paper conveying means can be effectively prevented.

Fifth Embodiment, FIGS. 13 to 15

FIG. 13 shows a first embodiment of the present invention. In FIG. 13, an elastic roller 22 and a spring 23 are provided in the apparatus for forcibly pressing the recording paper 7 against the dielectric drum 8 whereby separation of the recording paper 7 from the dielectric drum can be prevented.

FIG. 14 shows a modification of the fifth embodiment. As shown in FIG. 14, the surface of the electrically conductive layer 8*a* is uniformly coated or evaporated with the dielectric material 8*b* which is intermittently charged by the charger 13 inversely to the polarity of charge on the charged ink drop. Accordingly, when the elastic roller 22 forcibly presses the recording paper 7, the recording paper 7 inevitably enters into the above-mentioned un-uniform electric field and is strongly clamped on the dielectric drum 8 by this un-uniform electric field even if the recording paper 7 has wrinkles or the like. When the recording paper 7 is clamped only one time, the un-uniform electric field helps to clamp it. As shown in FIG. 14, when a voltage is applied by the direct current source 24 between the elastic roller 18 and the dielectric drum the un-uniform electric field between the recording paper 7 and the dielectric drum 8 become larger so that the recoding paper 7 can be more effectively clamped on the dielectric drum.

FIG. 15 shows another modification of the fifth embodiment. As shown in FIG. 15, the dielectric drum 8 is composed of the electrically conductive layer 8*a* and the dielectric layer 8*b*' which is intermittently disposed by coating or evaporating on the electrically conductive layer 8*a* and uniformly charged. The recording paper 7 is forcibly pressed by the elastic roller 18 toward the un-uniform electric field formed in such manner. In consequence, the construction of the charger can be simplified according to this modification.

Various other embodiments or modifications will become possible for those skilled in the art after receiving the teachings of the present disclosure without departing from the scope thereof.

What is claimed is:

1. An ink jet printing apparatus including ink ejection means for ejecting ink through a nozzle into an ink jet which is broken into ink drops, a charge electrode associated with the ink ejection means for charging the ink drops in response to printing signals, deflection electrodes associated with the ink ejecting means for deflecting the charged ink drops, recording paper conveying means associated with the ink ejecting means for conveying the recording paper upon which the charged ink drops impinge, and charging means associated with the conveying means for charging the surface of the recording paper conveying means inversely to the polarity of charge on the charged ink drops.

2. A method of reducing printing distortion in ink jet printing, wherein the ink jet is ejected from an ejection head, breaks into drops which are charged by a signal electrode in accordance with a printing signal and deflected before they strike a recording medium, comprising the steps of:

charging a record medium conveyor member with a charge of an inverse polarity to the charge applied to the ink drops by the signal electrode; and conveying the record medium on the record medium conveying member to a position where the record medium receives the ejected charged ink drops.

3. An ink jet printing apparatus including ink ejection means for ejecting ink through a nozzle into an ink jet which is broken into ink drops, a charge electrode associated with the ink ejection means for charging the ink drops in response to printing signals, deflection electrodes associated with the ink ejecting means for deflecting the charged ink drops, recording paper conveying means associated with the ink ejecting means for conveying the recording paper upon which the charged ink drops impinge, and charging means associated with the conveying means for charging the surface of the recording paper conveying means inversely to the polarity of charge on the charged ink drops, the recording paper conveying means comprising a dielectric layer and an electrically conductive layer, said dielectric layer being uniformly charged inversely to the polarity of charge on the charged ink drops.

4. An apparatus as defined in claim 3, wherein the recording paper conveying means comprises a rotatable cylindrical drum.

5. An apparatus as defined in claim 3, wherein the recording paper conveying means comprises a belt.

6. An ink jet printing apparatus including ink ejection means for ejecting ink through a nozzle into an ink jet which is broken into ink drops, a charge electrode associated with the ink ejection means for charging the ink drops in response to printing signals, deflection electrodes associated with the ink ejecting means for deflecting the charged ink drops, recording paper conveying means associated with the ink ejecting means for conveying the recording paper upon which the charged ink drops impinge, and charging means associated with the conveying means for charging the surface of the recording paper conveying means inversely to the polarity of charge on the charged ink drops, the recording paper conveying means comprising a dielectric layer and an electrically conductive layer, the dielectric layer being intermittently charged inversely to the polarity of charge on said charged ink drops.

7. An apparatus as defined in claim 6, wherein the dielectric layer is uniformly coated or evaporated upon said electrically conductive layer, said dielectric layer being intermittently charged.

8. An apparatus as defined in claim 6, wherein the dielectric layer is intermittently disposed upon the electrically conductive layer, the dielectric layer being uniformly charged.

9. An ink jet printing apparatus including ink ejection means for ejecting ink through a nozzle into an ink jet which is broken into ink drops, a charge electrode associated with the ink ejection means for charging the ink drops in response to printing signals, deflection electrodes associated with the ink ejecting means for deflecting the charged ink drops, recording paper conveying means associated with the ink ejecting means for conveying the recording paper upon which the charged ink drops impinge, and charging means associated with the conveying means for charging the surface of the recording paper conveying means inversely to the polarity of charge on the charged ink drops, the recording paper conveying means comprising an electrically conductive layer and a dielectric layer which is intermittently charged inversely to the polarity of charge on the charged ink drops, and an electric field caused by the charging largely varying at a portion of the dielectric layer with which the leading edge of the recording paper comes in contact.

10. An apparatus as defined in claim 9, wherein the intervals of intermittently charging decrease at the portion of the dielectric layer with which the leading edge of the recording paper comes in contact.

11. An apparatus as defined in claim 9, wherein the dielectric layer is thicker at the portion of the said dielectric layer with which the leading edge of the recording paper comes in contact.

12. An ink jet printing apparatus including ink ejection means for ejecting ink through a nozzle into an ink jet which is broken into ink drops, a charge electrode associated with the ink ejection means for charging the ink drops in response to printing signals, deflection electrodes associated with the ink ejecting means for deflecting the charged ink drops, recording paper conveying means associated with the ink ejecting means for conveying the recording paper upon which the charged ink drops impinge, and charging means associated with the conveying means for charging the surface of the recording paper conveying means inversely to the polarity of charge on the charged ink drops, the recording paper conveying means comprising an electrically conductive layer and a dielectric layer which is intermittently charged inversely to the polarity of charge on the charged ink drops, and a corona charger for charging the recording paper disclosed at the portion where the leading edge of the recording paper comes in contact with the dielectric layer.

13. An apparatus as defined in claim 12, wherein the dielectric layer is uniformly disposed on the electrically conductive layer and intermittently charged.

14. An apparatus as defined in claim 12, wherein the dielectric layers are intermittently disposed on the electrically conductive layer and uniformly charged.

15. An ink jet printing apparatus including ink ejection means for ejecting ink through a nozzle into an ink jet which is broken into ink drops, a charge electrode associated with the ink ejection means for charging the ink drops in response to printing signals, deflection electrodes associated with the ink ejecting means for deflecting the charged ink drops, recording paper conveying means associated with the ink ejecting means for conveying the recording paper upon which the charged ink drops impinge, and charging means associated with the conveying means for charging the surface of the recording paper conveying means inversely to the plurality of charge on the charged ink drops, the recording paper conveying means comprising an electrically conductive layer and a dielectric layer which is intermittently charged inversely to the polarity of charge on the charged ink drops and an elastic roller disposed at the portion of the dielectric layer with which the leading edge of the recording paper comes in contact, whereby the recording paper is forcedly pressed upon the dielectric layer.

16. An apparatus as defined in claim 15, wherein an electric field is applied between the recording paper conveying means and the elastic roller.

17. A method of reducing printing distortion in ink jet printing, wherein the ink jet is ejected from an ejection head, breaks into drops which are charged by a signal electrode in accordance with a printing signal and deflected before they strike a recording medium, comprising the steps of:

charging a record medium conveyor member with a charge of an inverse polarity to the charge applied to the ink drops by the signal electrode;

conveying the record medium on the record medium conveying member to a position where the record medium receives the ejected charged ink drops; and forming the conveying member of an electically conductive layer covered by a dielectric layer which receives the charge of inverse polarity.

18. A method according to claim 17, comprising the step of evenly charging the dielectric layer with the charge of inverse polarity.

19. A method according to claim 17, comprising the step of intermittently charging the dielectric layer to produce spaced apart charged areas of inverse polarity on the conveyor member.

20. A method according to claim 19, where the spacing between intermittent dielectric layer portions is provided closer in an area of the conveying member adapted to receive a leading edge of the recording medium.

21. A method according to claim 17, including providing the dielectric layer at intermittent spaced locations along the conveying member which are each charged with the charge of inverse polarity.

22. A method according to claim 21, where a thickness of the dielectric layer portions on the conveying member is thicker in an area of the conveying member adapted to receive a leading edge of the recording medium than elsewhere on the conveying member.

23. A method of reducing printing distortion in ink jet printing, wherein the ink jet is ejected from an ejection head, breaks into drops which are charged by a signal electrode in accordance with a printing signal and deflected before they strike a recording medium, comprising the steps of:

charging a record medium conveyor member with a charge of an inverse polarity to the charge applied to the ink drops by the signal electrode;

conveying the record medium on the record medium conveying member to a position where the record medium receives the ejected charged ink drops; and rolling the recording medium onto the conveying member using an elastic roller.

* * * * *